United States Patent Office 2,761,848
Patented Sept. 4, 1956

---

2,761,848

PROCESS OF MAKING SHAPED CARBON ARTICLES

Raymond M. Bushong and Arnold A. Kellar, Fostoria, Ohio, assignors to Union Carbide and Carbon Corporation, a corporation of New York No Drawing. Application May 8, 1952,
Serial No. 286,833

4 Claims. (Cl. 252—510)

This invention relates to improved carbon bodies of the type that are shaped, as by extrusion, and hardened by baking and the process for making such articles.

According to conventional practice, many types of carbon articles, such as tubes and electrodes, are prepared by mixing carbon and a binder, shaping the mixture as by extruding it from a die, and baking the green or extruded article to drive off the volatile constituents of the binder. In the processes of the prior art a common binder is pitch having a melting point of from about 50° C. to 100° C. The pitch used must be one which will render the mixture plastic enough to be shaped or extruded. The pitch must not be too fluid at mixing temperatures since the mixture must be stiff enough to impart to the shaped green article sufficient rigidity so that it will retain its shape during the baking operation. The loss of volatile constituents from the pitch binder during baking reduces the density of the finished article. Often these volatile constituents cause the article to swell during baking which results in the deformation and cracking of the article.

It is the primary object of this invention to provide carbon articles which have a relatively high apparent density and a process for making such articles. Another object is to reduce losses during baking due to cracking or swelling of the carbon article.

According to the present invention, the objects are accomplished by using as a binder a mixture of a pitch having a high melting point, preferably around 150° C., and a plasticizer which renders the pitch fluid at temperatures not greatly in excess of room temperature and which will coke in part upon subsequent baking rather than being driven off like the volatile constituents of pitches having lower melting points.

The pitches used in the process of the present invention should have melting points of not less than 140° C., and one having a melting point of not less than about 150° C. is preferred. Such pitches are ordinarily brittle solids at room temperature and can be comminuted by conventional pulverizing apparatus to facilitate their blending with the solids and plasticizer. Both coal tar and petroleum pitches can be used in making the carbon articles of the invention.

A pitch having a relatively high melting point, such as those used in the process of the invention, contains less volatile matter than the pitches having melting points of less than 100° C. that are conventionally used in the manufacture of carbon articles. When carbon articles are made according to the present invention, the volume of volatile matter escaping from the pitch binder during baking is relatively small. This decrease in the volume of escaping volatile matter insures a denser product and a reduction in loses due to cracking or swelling during baking.

A plasticizer is incorporated in the mixture of pitch and solid carbon particles to render the mixture fluid at temperatures below the melting point of the pitch during extrusion with conventional equipment. The plasticizer used in the process of the invention is a compound containing the furfuryl radical, such as furfural or furfuryl alcohol, which is liquid at room temperature, or mixtures of two or more such compounds. The preferred plasticizer comprises a mixture of equal parts of furfural and furfuryl alcohol. Excellent results have been obtained using either furfural or furfuryl alcohol alone as the plasticizer. Excellent extruding properties have been obtained with plasticizer to pitch ratios of from about 1:3 to 1:4 by weight. The ratio can of course be altered to provide more or less rigidity in the mix as desired. Upon being baked, a substantial portion of the plasticizer of the invention is converted to coke or carbon thus tending to increase the apparent density of the shaped carbon article. A catalyst, such as benzene sulfonic acid, may be added to promote the solidification of the plasticizer although a catalyst is not usually needed.

The carbon particles mixed with the pitch and plasticizer in making carbon articles according to the invention are preferably comminuted. Cokes and carbon blacks are examples of carbon particles that have been found to be satisfactory in making electrodes and tubes. Other carbon particles that are used in the manufacture of shaped carbon articles by conventional processes can be employed if desired.

The carbon particles, pitch and plasticizer may be blended satisfactorily in a number of ways. In one blending operation, pitch and carbon particles are mixed and the mixture passed through a pulverizer to reduce the pitch and carbon particles to a fine flour. To the finely divided particles the plasticizer is added and the materials are blended suitably at a temperature of between about 65° C. to 75° C. for approximately thirty minutes. The mixing of the pitch and carbon particles can be expedited by carrying out this operation at a temperature above the melting point of the pitch. In one such mixing operation using a pitch having a melting point of about 150° C. the temperature was maintained in the range of from just over 150° C to 180° C. This mixing at the elevated temperature was done in an inert atmosphere, for example steam, to prevent oxidation of the constituents.

Another blending operation comprises pulverizing the pitch, mixing the pulverized pitch with comminuted carbon particles and subsequently adding the plasticizer to the mixture again using a temperature of from about 65° C. to 75° C. and a holding period of about thirty minutes while the plasticizer is being mixed with the pitch and carbon particles. Alternatively, the pitch and plasticizer may be first mixed before they are blended with the carbon particles.

The mixture of pitch, plasticizer, and carbon particles blended in any of the ways described above is shaped by the application of pressure, preferably by extrusion according to conventional techniques, into the desired shape and baked, suitably in a ring furnace, at temperatures up to about 1400° C. The baked articles may be further baked or even graphitized by heating them to higher temperatures according to well understood procedures.

As an example of an article of the invention manufactured according to the process of the invention, a carbon shell for a projector carbon and the process of manufacturing it will be described in detail. It is to be understood that the description of the particular article and process is illustrative only and by no means limits the scope of the invention.

The carbon particles selected for the manufacture of the carbon shell were petroleum coke pulverized to a flour and thermatomic black. A ratio of 70 parts coke to 30 parts black was found to give maximum densities in the finished product. To 100 pounds of the carbon particles, 24 pounds of a petroleum pitch having a melting point of about 150° C. were added. The carbon particles and pitch were mixed and pulverized as described above. Eight pounds of a plasticizer consisting of equal parts of furfural and furfuryl alcohol were blended with the mixture and the ingredients mixed for about thirty minutes at a temperature of approximately 70° C. The blended constituents were transferred to an extruded and extruded in the form of a tube which was cut into sections about one foot long. The cut sections or green shells were baked for about 55 hours at temperatures up to about 1400° C. in a ring furnace. The hardened shells were removed from the furnace. The apparent density of the carbon shells averaged 1.878. The shells had a specific resistance of 0.0012.

The baking time of 55 hours for the shells in the above example compares to a baking time of about 197 hours for shells made according to standard procedures with conventional materials. The average apparent density of conventional carbon shells made according to the prior art is in the order of 1.7.

What is claimed is:

1. A process for the manufacture of shaped carbon articles which comprises blending into a substantially homogeneous mass a mixture of solid carbon particles and a pitch having a melting point about about 140° C., rendering the mixture of carbon particles and pitch fluid with a plasticizer comprising at least one of the materials in the group consisting of furfural and furfuryl alcohol, the ratio of plasticizer to pitch being between about 1 to 3 and 1 to 4, extruding the fluid mixture to shape said article and hardening said article by baking.

2. A process for the manufacture of shaped carbon articles which comprises blending into a substantially homogeneous mass a mixture of carbon particles and a pitch having a melting point above about 140° C., rendering the mixture of carbon particles and pitch fluid with a plasticizer comprising a mixture of furfural and furfuryl alcohol, the ratio of plasticizer to pitch being between about 1 to 3 and 1 to 4, extruding the fluid mixture to shape said article and hardening said article by baking.

3. A process for the manufacture of shaped carbon articles which comprises blending into a substantially homogeneous mass a mixture of carbon particles and a pitch having a melting point above about 140° C., rendering the mixture of carbon particles and pitch fluid with a plasticizer comprising equal parts of furfural and furfuryl alcohol, the ratio of plasticizer to pitch being between about 1 to 3 and 1 to 4, extruding the fluid mixture to shape said article and hardening said article by baking.

4. A process for the manufacture of shaped carbon articles which comprises blending into a substantially homogeneous mass a mixture of carbon particles consisting of 70 parts coke and 30 parts carbon black and a pitch having a melting point above about 140° C., pulverizing the mixture of pitch and carbon particles to the consistency of fine flour, rendering the mixture of carbon particles and pitch fluid with a plasticizer comprising equal parts of furfual and furfuryl alcohol, the ratio of plasticizer to pitch being about 1 to 3 and 1 to 4, extruding the fluid mixture to shape said article and hardening said article by baking up to a temperature of about 1400° C., thereby producing a shaped carbon article having a high apparent density of at least 1.8.

References Cited in the file of this patent

UNITED STATES PATENTS 2,582,764    Bailey _____ Jan. 15, 1952

FOREIGN PATENTS 510,256    Great Britain _____ 1939